B. J. MIRACKY.
CAKE COATING MACHINE.
APPLICATION FILED MAY 11, 1916.
1,255,624.
Patented Feb. 5, 1918.
2 SHEETS—SHEET 1.
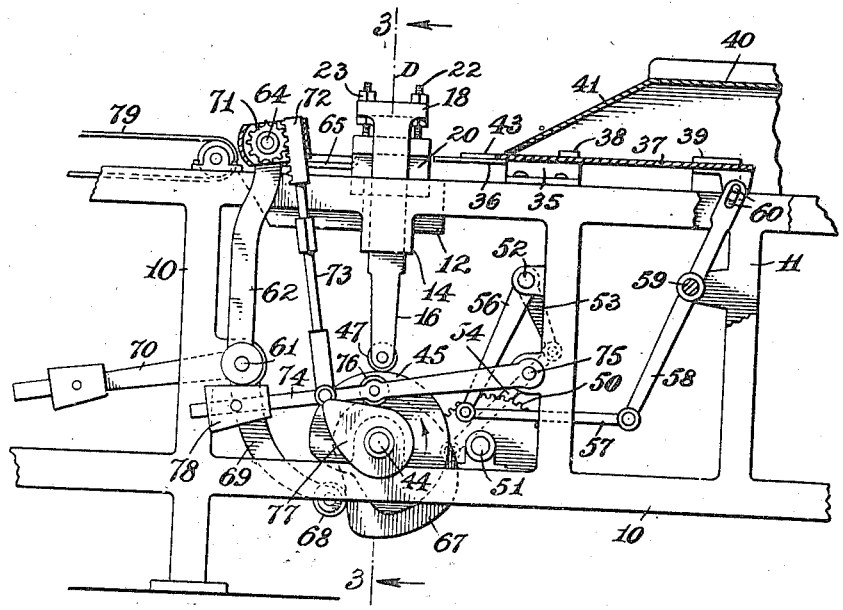
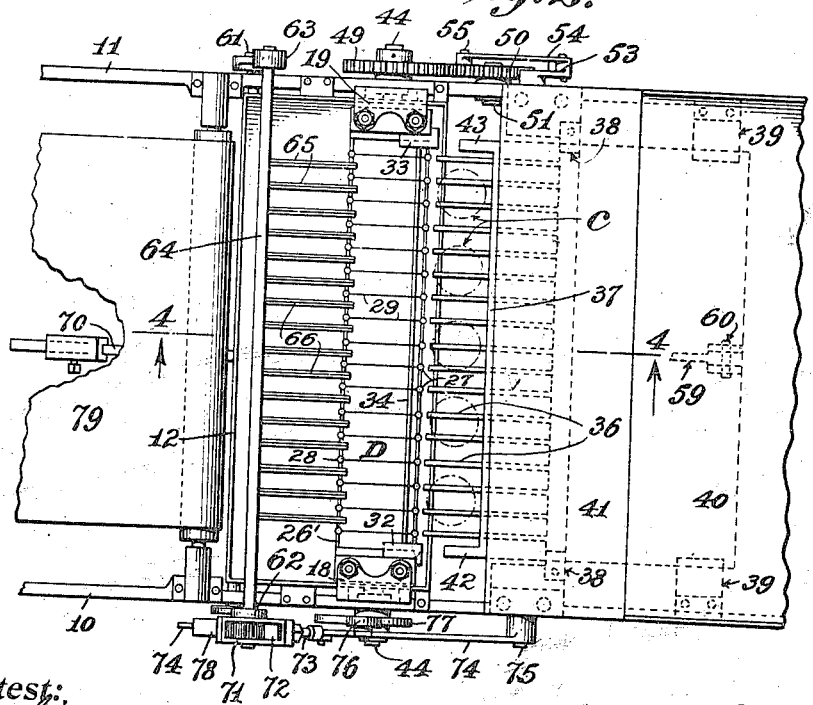
Attest:
Inventor: Barney J. Miracky
by James R. Offield, Atty.

B. J. MIRACKY.
CAKE COATING MACHINE.
APPLICATION FILED MAY 11, 1916.
1,255,624.
Patented Feb. 5, 1918.
2 SHEETS—SHEET 2.
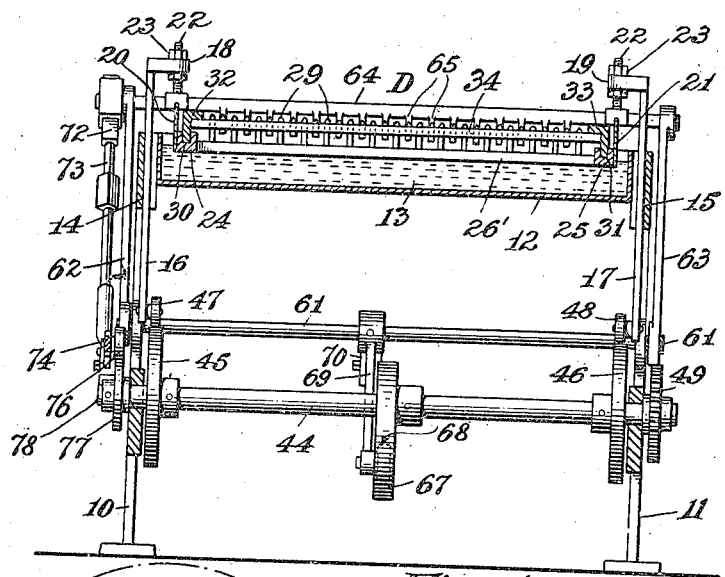
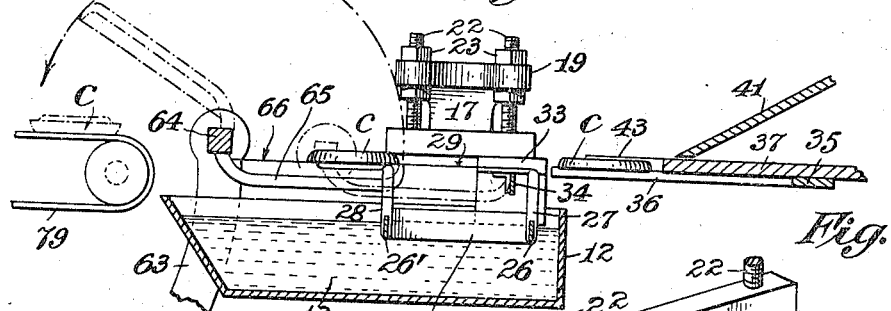
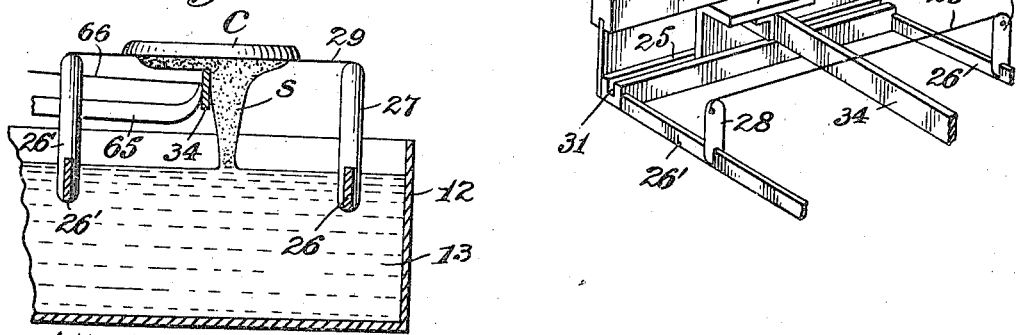
Inventor:
Barney J. Miracky
by James R. Offield Atty.

UNITED STATES PATENT OFFICE.

BARNEY J. MIRACKY, OF LITTLE FERRY, NEW JERSEY, ASSIGNOR TO NATIONAL BISCUIT COMPANY, OF NEW YORK, N. Y., A CORPORATION OF NEW JERSEY.

CAKE-COATING MACHINE.

1,255,624.   Specification of Letters Patent.   Patented Feb. 5, 1918.

Application filed May 11, 1916. Serial No. 96,752.

*To all whom it may concern:*

Be it known that I, BARNEY J. MIRACKY, a citizen of the United States, and a resident of Little Ferry, in the county of Bergen and State of New Jersey, have invented certain new and useful Improvements in Cake-Coating Machines, of which the following is a specification.

My invention relates to machines for coating or icing biscuits, cakes, or other articles with sugar, chocolate or other materials.

My invention is concerned particularly with machines in which cakes are fed onto a dipping frame which is dipped to bring the lower surface of the cakes into contact with icing or coating material, and from which dipping frame the coated cakes are received by arms and deposited, coated side up, on a conveyer. In such machines considerable coating or icing material clings to the cakes after the dipping frame is raised and the excess material is thrown and spattered about on the machine and the floor. The important object of my invention is to provide means for automatically scraping off surplus coating or icing material from the cakes after the dipping operation and before the coated cakes are engaged by the depositing mechanism.

On the accompanying drawings I have shown a machine of the class referred to with my improved scraping mechanism applied. On the drawing Figure 1 is a side elevation of a machine, Fig. 2 is a plan view, Fig. 3 is a sectional view on plane 3—3, Fig. 1, Fig. 4 is an enlarged longitudinal sectional view on plane 4—4, Fig. 2, Fig. 5 is an enlarged sectional view of the dipping frame showing the scraper mechanism in the act of removing surplus icing from a cake, and Fig. 6 is a perspective view of one end of the dipping frame and scraper mechanism.

The supporting structure for the machine comprises the skeleton side frames 10 and 11. Secured between these side frames at the upper edge thereof is a dipping trough or tank 12 which contains coating or icing material 13. Adjacent the ends of the tank 12 are the vertical guide ways 14 and 15 for the vertical slide rods 16 and 17. The upper ends of these slide rods have the inwardly extending shelves 18 and 19 respectively from which the ends 20 and 21 of the dipping frame D are supported, such support being shown vertically adjustable by means of threaded hangers 22 engaged by nuts 23. At the bottom of the dipping frame sides 20 and 21 are the strips 24 and 25 between which extend the transverse bars 26 and 26'. Extending upwardly from these bars are pairs of pins 27 and 28 suitably spaced transversely on the bars and each pair supporting a wire 29, these wires being all in a common plane for receiving the cakes c to be coated. The strips 24 and 25 have the guide slots 30 and 31 respectively for receiving the lower edges of L-shaped end pieces 32 and 33 respectively between whose upper ends extends a scraping bar 34, the top surface of this bar being a short distance below the wires 29. As will be presently described the dipping frame receives cakes on its wires 29 and is then lowered into the tank 12 to dip the cakes into the material 13 and after raising of the frame, the scraper bar 34 is shifted underneath the cakes to scrape surplus coating material therefrom.

Extending parallel with the dipping frame to the right thereof is a grid or comb frame 35 which is secured to the tops of frame sides 10 and 11, the supporting prongs or ribs 36 of the frame projecting toward the dipping frame and substantially in the horizontal plane of the supporting wires 29 when the dipping frame is in its upper position. Above the grid frame 35 is a pusher plate 37 which is guided in fittings 38 and 39, cakes resting on the grid frame in front of the pusher plate being moved onto the dipping frame wires at regular intervals. Above the pusher plate is a platform 40 for cakes to be coated, an incline 41 leading from the platform to the front end of the pusher plate so that cakes will be fed to the prongs or ribs 36 in front of the pusher plate. At its sides the pusher plate has the extensions 42 and 43 for abutting against the end pieces 32 and 33 respectively which support the scraper bar 34. These projections push the scraper rod across the dipping frame in advance of the cakes fed to the frame by the pusher plate.

After a row of cakes has been fed onto the dipping frame the pusher plate is withdrawn and the dipping frame is reciprocated vertically. Cam and lever mechanisms are preferably utilized for reciprocating the dipping frame and shifting the pusher plate.

Journaled in the frame sides 10 and 11 below the dipping frame is a shaft 44 which is driven from any suitable source. At its ends this shaft carries cam disks 45 and 46 with which coöperate rollers 47 and 48 on the lower ends of the slide rods 16 and 17 respectively. At one end of this shaft is also mounted an elliptical gear 49 which meshes with another elliptical gear 50 on the stub shaft 51 extending from frame 11. Above the shaft 51 a counter shaft 52 extends between the frames sides 10 and 11 and carries at its outer end a crank arm 53 which is connected by a rod 54 with the crank pin 55 on the gear 50. Another arm 56 extends from shaft 52 and is connected by link 57 with the lower end of lever 58 which is pivoted at an intermediate point on pin 59 and whose upper end has pin and slot connection 60 with the pusher plate 37. With this arrangement when the shaft 44 rotates the elliptical gears and the lever mechanism intervening between the gear 50 and lever 58 will effect rocking of this lever and horizontal reciprocation of the pusher plate 37, the movements of the plate toward the dipping frame being slow and the return movement being rapid. The movement is such that the cams 45 and 46 will become effective to reciprocate the dipping frame immediately after the cakes have been fed thereon by the pusher plate.

Describing now the mechanism for removing the dipped cakes from the dipping frame, a shaft 61 is journaled between the frame sides 10 and 11 and supports at its ends the upwardly extending arms 62 and 63 which at their upper ends journal the rod 64. This rod supports a row of bow shaped fingers 65 between the ends of each of which is strung a wire 66, the wires forming a grid for receiving the iced cakes from the dipping frame. On the shaft 44 is a cam 67 which is engaged by a cam roller 68 on the end of the arm 69 extending downwardly from shaft 61, a weighted arm 70 extending from the shaft tending to hold the cam roller against the cam. When the shaft 61 is rocked during engagement of the cam roller with the cam the fingers 65 are shifted first underneath the dipping frame and then away therefrom. During inward travel of the fingers their ends encounter the scraping bar 34 which was previously shifted toward the fingers by the pusher plate 37 which charged cakes onto the dipping frame. This shifting of the scraper bar by the fingers will carry the bar a short distance underneath and across the iced surfaces of the cakes so that any surplus icing $s$ is scraped away, as clearly indicated in Fig. 5.

On one end of the rod 64 is secured a gear pinion 71 with which meshes a rack 72 at the end of a rod 73 extending upwardly from the cam lever 74, this cam lever being pivoted to the machine frame at 75 and at an intermediate point mounting the cam roller 76 which coöperates with the cam 77 on shaft 44, the weight 78 on the lever holding the cam roller to the cam. The shape of the cams 67 and 77 and their timing with relation to the cam 46 is such that after the dipping frame has been dipped to coat cakes thereon, the fingers 67 will be shifted underneath the cakes to first cause the scraper 34 to scrape off superfluous material, and then the fingers are swung upwardly sufficiently to receive the cakes, and are then drawn bodily outwardly until their ends clear the dipping frame, and then the rod 64 is rapidly rotated to swing the fingers through practically 180 degrees to invert the cakes and to deposit them, iced side up, on a conveyer belt 79.

The automatic scraper mechanism forms a very desirable and valuable attachment as by its use surplus icing material is scraped from the cakes and dropped into the tank and is consequently prevented from dripping or splashing on the machine and in the vicinity when the cakes are rapidly removed from the dipping frame to the conveyer. Considerable saving also results in coating material for the scraper mechanism permits only a predetermined amount of material to remain on the cakes, all surplus being returned to the tank.

I do not, of course, desire to be limited to the exact construction and arrangement shown and described as modifications are no doubt possible which would still come within the scope of the invention.

I claim as follows:

1. In a coating machine of the class described, the combination with a tank for coating material, of a vertically reciprocable dipping frame, horizontally reciprocable feeding mechanism for feeding cakes to said frame, horizontally reciprocable receiving mechanism for receiving dipped cakes from said frame, a scraper bar supported on said dipping frame to reciprocate horizontally thereon below dipped cakes, said bar being normally disconnected from said feeding mechanism and receiving mechanism but being in the path thereof to be shifted toward the receiving mechanism before a dipping operation and to be shifted back by the receiving mechanism to scrape superfluous coating material from the cakes before they are received by the receiving mechanism.

2. In a coating machine of the class described, the combination with a tank for coating material, of a vertically reciprocable dipping frame, horizontally reciprocable feeding mechanism for feeding cakes to said frame, horizontally reciprocable receiving mechanism for receiving dipped cakes from said frame, transverse guideways on said frame, blocks in said guideways, a scraper bar extending between and supported on said blocks to reciprocate horizontally thereon below said dipped cakes, said bar being disconnected from said feeding mechanism and receiving mechanism but being in the path thereof to be shifted toward the receiving mechanism by the feeding mechanism before a dipping operation and to be shifted back by the receiving mechanism to scrape superfluous coating material from the cakes before they are received by the receiving mechanism.

In witness whereof I hereunto subscribe my name this 28th day of April, A. D. 1916.

BARNEY J. MIRACKY.